(12) United States Patent
Keld

(10) Patent No.: US 8,498,909 B1
(45) Date of Patent: *Jul. 30, 2013

(54) SYSTEM AND METHOD FOR ASSOCIATING FINANCIAL TRANSACTION DATA WITH USER'S PROJECT DATA IN CASH TRANSACTIONS

(71) Applicant: JP Morgan Chase Bank, N.A., New York, NY (US)

(72) Inventor: Marcia Keld, Middleton, DE (US)

(73) Assignee: JPMorgan Chase Bank, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/680,371

(22) Filed: Nov. 19, 2012

Related U.S. Application Data

(60) Continuation of application No. 13/535,492, filed on Jun. 28, 2012, now Pat. No. 8,332,273, which is a continuation of application No. 13/094,937, filed on Apr. 27, 2011, now Pat. No. 8,239,270, which is a division of application No. 11/952,457, filed on Dec. 7, 2007, now Pat. No. 7,949,579.

(51) Int. Cl.
*G06Q 20/00* (2012.01)
*G06Q 30/00* (2012.01)
*G06Q 40/00* (2012.01)
*G06Q 30/06* (2012.01)
*G06Q 20/10* (2012.01)

(52) U.S. Cl.
CPC ............ *G06Q 20/00* (2013.01); *G06Q 30/0601* (2013.01); *G06Q 20/10* (2013.01); *G06Q 20/105* (2013.01); *G06Q 20/108* (2013.01)

USPC ................ 705/30; 705/16; 705/26.1; 705/39; 705/41; 705/42; 715/744

(58) Field of Classification Search
CPC ....... G06Q 20/20; G06Q 20/202; G06Q 20/10; G06Q 20/105; G06Q 20/108; G07F 19/20; G07F 20/1085
USPC .......... 705/16, 21, 26.1, 41, 39, 42; 235/379; 707/999.01, 999.03
See application file for complete search history.

(56) References Cited

U.S. PATENT DOCUMENTS 4,375,032 A 2/1983 Uchida
423,318 A 12/1983 Gotou et al.

(Continued)

OTHER PUBLICATIONS

Brooker, Dena. "Purchasing cards: the next generation." Modern Purchasing Jun. 1, 1997: Research Library, ProQuest. Web Mar. 24, 2011.*

(Continued)

*Primary Examiner* — Olusegun Goyea
(74) *Attorney, Agent, or Firm* — Goodwin Procter LLP

(57) ABSTRACT

This invention relates to an expense reporting system for viewing and manipulating a user's financial transaction data and a method for associating financial transaction data with a user's project data. The system includes a user's financial transaction data hosted in a data storage unit, addressable on a network, and accessible by a remote user on a user interface unit having a user input means and a display; and an expense reporting module having a graphical user interface (GUI) that allows a user to define project category data and associate representations of the user's financial data with the user-defined project category data.

23 Claims, 7 Drawing Sheets

U.S. PATENT DOCUMENTS

| | | | |
|---|---|---|---|
| 4,423,313 | A | 12/1983 | Tanigaki |
| 4,587,379 | A | 5/1986 | Masuda |
| 4,594,663 | A | 6/1986 | Nagata et al. |
| 4,713,761 | A | 12/1987 | Sharpe et al. |
| RE32,985 | E | 7/1989 | Nagata et al. |
| 4,877,947 | A | 10/1989 | Mori et al. |
| 5,220,501 | A | 6/1993 | Lawlor et al. |
| 5,604,802 | A | 2/1997 | Holloway et al. |
| 5,809,483 | A | 9/1998 | Broka et al. |
| 5,903,881 | A | 5/1999 | Schrader et al. |
| 6,006,205 | A | 12/1999 | Loeb et al. |
| 6,039,245 | A | 3/2000 | Symonds et al. |
| 6,078,891 | A | 6/2000 | Riordan et al. |
| 6,334,116 | B1 | 12/2001 | Ganesan et al. |
| 6,360,209 | B1 | 3/2002 | Loeb et al. |
| 6,519,572 | B1 | 2/2003 | Riordan et al. |
| 6,606,606 | B2 | 8/2003 | Starr |
| 6,609,113 | B1 | 8/2003 | O'Leary et al. |
| 6,859,212 | B2* | 2/2005 | Kumar et al. ................. 715/744 |
| 6,880,079 | B2 | 4/2005 | Kefford et al. |
| 7,409,392 | B2* | 8/2008 | Greer et al. ........................... 1/1 |
| 7,437,330 | B1* | 10/2008 | Robinson et al. ............... 705/67 |
| 7,680,708 | B1* | 3/2010 | Mooney et al. ................. 705/31 |
| 2003/0023492 | A1 | 1/2003 | Riordan et al. |
| 2003/0023594 | A1* | 1/2003 | Ramamurthi ..................... 707/7 |
| 2003/0088460 | A1 | 5/2003 | Riordan et al. |
| 2004/0019553 | A1 | 1/2004 | Setz et al. |
| 2004/0080527 | A1* | 4/2004 | Elliott ........................... 345/734 |
| 2004/0117361 | A1* | 6/2004 | Greer et al. ........................ 707/3 |
| 2005/0131792 | A1* | 6/2005 | Rowe .............................. 705/35 |
| 2005/0171881 | A1* | 8/2005 | Ghassemieh et al. ........... 705/35 |
| 2007/0073562 | A1* | 3/2007 | Brice et al. ........................ 705/5 |
| 2007/0156392 | A1* | 7/2007 | Balchandran et al. ............ 704/9 |
| 2008/0301153 | A1* | 12/2008 | Greer et al. ..................... 707/10 |

OTHER PUBLICATIONS

"Purchasing Cards: A Debit/Credit Card that Tracks Spending by On-the-Road Employees All those small purchases can be tough to keep straight. A new card from Comdata helps." Financial Services Marketing Apr. 3, 2000: Banking Information Source, ProQuest. Web. Mar. 24, 2011.*

Klaus Hintz. "Put it on my card, please." CMA Apr. 1, 1998: ABI/INFORM Global, ProQuest. Web. Mar. 24, 2011.*

"Purchasing Cards: A Debit/Credit Card that Tracks Spending by On-the-Road Employees All those small purchases can be tough to keep straight. A new card from Comdata helps." Financial Services Marketing Apr. 3, 2000; Banking Information Source, ProQuest. Web. Mar. 24, 2001.

Klaus, Hintz. "Put it on my card, please." CMA Apr. 1, 1998: AB/IN-FORM Global, ProQuest Web. Mar. 24, 2011.

* cited by examiner

| Expense Allocation | Nagle Job | Wallace Job | Bloomer Job | Shared Expenses |

Friday, March 3, 2006

PWHITE GENERAL CONTRACTOR

- Update profile
- Free alerts
- Print
- Help with this page
- Pay card
- Automatic payments 🔒 Secure Online Session
Last logged on at 8:45 am EST on 02/23/2008

Activity for... All Accounts (..6769) ▾

Show Me... my account activity  Since Last Statement ▾  Show

| Trans Date | Post Date | Type | Description (Merchant Category) | Amount |
|---|---|---|---|---|
| 03/03/2006 | 03/03/2006 | Sale | HOME DEPOT #1368 (Construction Supplies) | $1023.45 |
| 03/07/2006 | 03/03/2006 | Sale | ROB'S BIG BOY (Dining) | $36.45 |
| 03/12/2006 | 03/03/2006 | Sale | HOME DEPOT #1426 (Construction Supplies) | $2000.45 |
| 03/19/2006 | 03/03/2006 | Sale | PLUMBMART, (Construction Supplies) | $135.49 |
| 03/19/2006 | 03/19/2006 | Sale | HOME DEPOT #1368 (Construction Supplies) | $530.45 |
| 03/19/2006 | 03/19/2006 | Return | HOME DEPOT #1368 (Construction Supplies) | -$530.45 |
| 03/22/2006 | 03/22/2006 | Sale | AQUARIUS HARDWARE (Construction Supplies) | $298.45 |
| 03/25/2006 | 03/25/2006 | Sale | HOME DEPOT #1426 (Construction Supplies) | $780.45 |

Transactions Total: $-768.56
Last Statement Balance: $7,315.58

Existing Jobs

Wallace Kitchen | Bloomer Extension | Shared expenses

Security | Terms of Use | Legal Agreements

| Trans Date | Post Date | Type | Description (Merchant Category) | Amount |
|---|---|---|---|---|
| 03/03/2006 | 03/03/2006 | Sale | HOME DEPOT #1368 (Construction Supplies) | |
| 03/07/2006 | 03/03/2006 | Sale | ROB'S BIG BOY (Dining) | $36.45 |
| 03/12/2006 | 03/03/2006 | Sale | HOME DEPOT #1426 (Construction Supplies) | $2000.45 |
| 03/19/2006 | 03/03/2006 | Sale | PLUMBMART (Construction Supplies) | $135.49 |
| 03/19/2006 | 03/19/2006 | Sale | HOME DEPOT #1368 (Construction Supplies) | $530.45 |
| 03/19/2006 | 03/19/2006 | Return | HOME DEPOT #1368 (Construction Supplies) | -$530.45 |
| 03/22/2006 | 03/22/2006 | Sale | AQUARIUS HARDWARE (Construction Supplies) | $298.45 |
| 03/25/2006 | 03/25/2006 | Sale | HOME DEPOT #1426 (Construction Supplies) | $780.45 |

Transactions Total: $-768.56
Last Statement Balance: $7,315.58

Tabs: Expense Allocation | Nagle Job | Wallace Job | Bloomer Job | Shared Expenses

PWHITE GENERAL CONTRACTOR

Friday, March 3, 2006
Secure Online Session
Last logged on at 8:45 am EST on 02/23/2008

Existing Jobs: Nagle, Wallace Kitchen, Bloomer Extension, Shared expenses $1023.45

Security | Terms of Use | Legal Agreements

Fig. 3

Project Category Input Form

- Category Title / Name — 310
- Client / Subject
- Category Type
- Description
- Date — 350
- 320
- Location
- Matter / Transaction
- Picture / Icon 330
- Dept. / Team
- Code Identifier
- Notes / Comments
- 340

| Expense Allocation | ● Nagle Job | ● Wallace Job | ● Bloomer Job | ● Shared Expenses |

Friday, March 3, 2006

PWHITE GENERAL CONTRACTOR

Nagle Reno

● Print  ● Help with this page

Summary [Nagle Job ▼]

Total materials spent to date:

| December | 24,945.12 |
| January | 4,112.00 |
| February | 3,394.64 |
| March | 7,013.92 |
| | 10,424.56 |

Trading vs Estimate: Nagle Job  −2,043.22

— 420

— 460

Detailed Reporting [Nagle Job ▼] — 410

Supplies   Cardholder   [Month ▼]

Jan   Feb   [Mar]   Apr

AQUARIUS HARDWARE (Construction Supplies)
03/22/2006  Sale                  $298.45

HOME DEPOT              (Construction Supplies)
03/03/2006  Sale                 $1023.45
03/19/2006  Sale                  $530.45
03/19/2006  Return                $530.45
03/12/2006  Sale                 $2000.45
03/25/2006  Sale                  $780.45

PLUMBMART              (Construction Supplies)
03/19/2006  Sale                  $135.49

ROB'S BIG BOY           (Dining)
03/07/2006  Sale                   $36.45

See more information ●

What would you like to do?

| Download into... Money 2006 | Download into... [Q&Books] | Print Cost Invoice | Enter Non-card expenses |

— 440        — 450        — 430

Security | Terms of Use | Legal Agreements

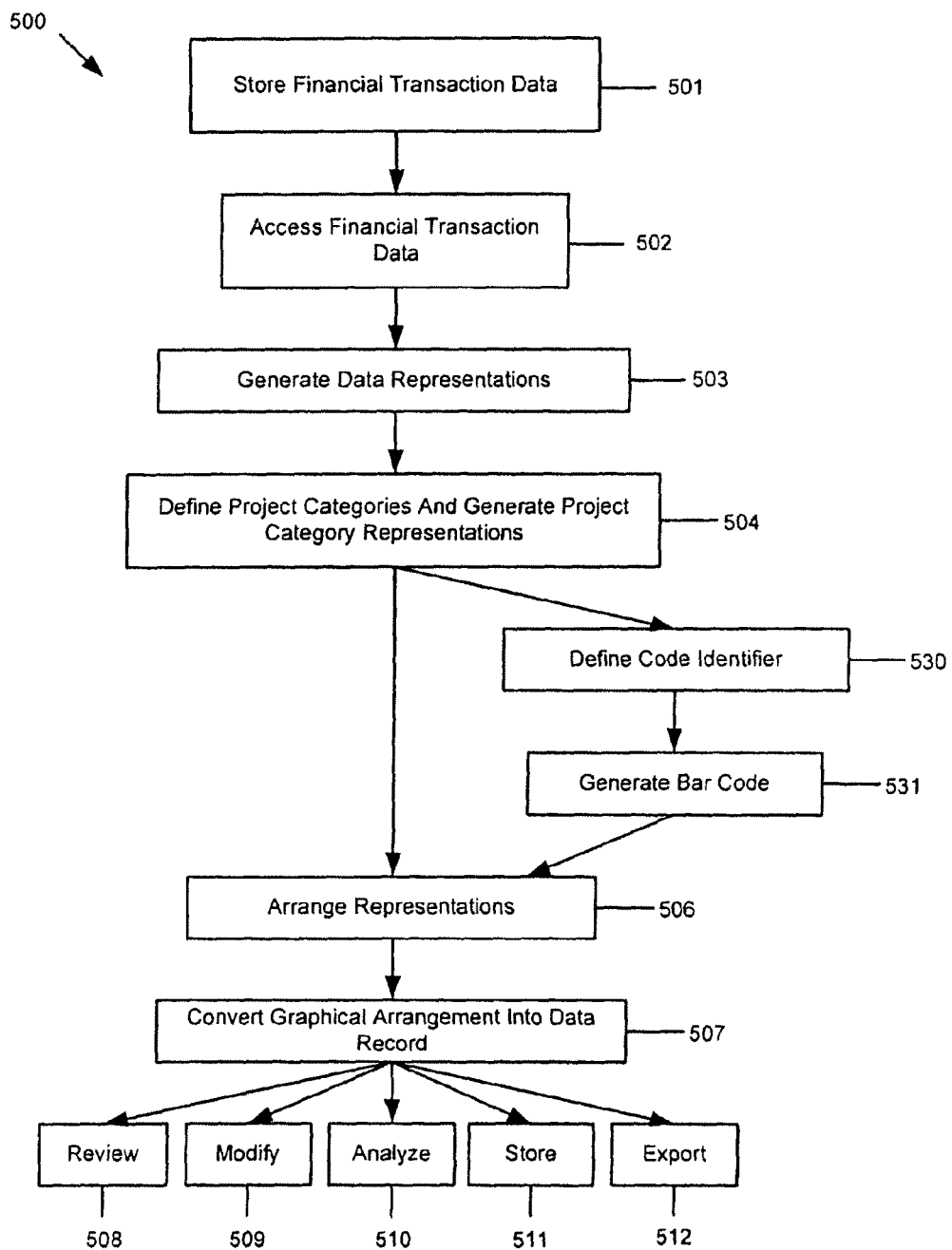

SYSTEM AND METHOD FOR ASSOCIATING FINANCIAL TRANSACTION DATA WITH USER'S PROJECT DATA IN CASH TRANSACTIONS

CROSS-REFERENCE TO RELATED APPLICATIONS

This application is a continuation of and claims priority from U.S. patent application Ser. No. 13/535,492, filed Jun. 28, 2012, which is a continuation of and claims priority from U.S. patent application Ser. No. 13/094,937, now U.S. Pat. No. 8,239,270, filed Apr. 27, 2011, which is a divisional of and claims priority from U.S. patent application Ser. No. 11/952,457, now U.S. Pat. No. 7,949,579, filed Dec. 7, 2007, all of which are hereby incorporated by reference for all purposes.

FIELD OF THE INVENTION

This invention relates to an expense reporting system and method for associating financial transaction data with a user's project data.

BACKGROUND OF THE INVENTION

In the emerging global economy, e-commerce and e-business have increasingly become a necessary component of business strategy and a strong catalyst for economic development. The integration of information and communications technology in business has revolutionized relationships within organizations and those between and among organizations and individuals. Specifically, the use of e-commerce and e-business solutions by businesses and individuals has enhanced productivity, reduced costs, encouraged greater customer participation, and enabled mass customization.

E-commerce or e-business solutions may allow an individual to perform financial transactions over the Internet through a secure website. This type of service enables customers to do their banking or financial transaction processing from anywhere where Internet access is available. In many cases, a web browser is utilized and any normal Internet connection is suitable.

For example, financial institutions have recently begun offering businesses a credit card account that offers account holders the option of shifting invoice-based check spending to a business credit card. Business credit cards designed for contractors have the objective of inducing them to do away with invoice-based payments by check and shift to more frequent use of their business credit cards. Problematically, no convenient method or system enabling such a customer or business to categorize and allocate this financial transaction information currently exists.

Contractors and other businesses frequently make purchases or issue disbursements for multiple projects, clients, or customers in a single financial transaction. When a contractor uses an open-loop credit card to make a single purchase of multiple items for a variety of projects, an electronic billing application generally allows the contractor to view only limited data regarding the transaction (e.g., the date, the name of the vendor, and the total dollar amount charged to the credit card) and to electronically settle payment. However, a contractor (or other business or individual) cannot allocate a percentage or dollar amount of the total dollar amount charged to the credit card at a point of sale to a particular project, job, or client matter. As a result, the contractor may need to collect and examine numerous paper receipts to properly charge their clients for items purchased for a particular project.

Therefore, a convenient system and method for associating financial transaction data with a user's project data is desired.

Further, a convenient system and method for allocating a percentage or dollar amount from financial transaction data available to a user-defined project category is desired.

SUMMARY OF THE INVENTION

The invention comprises, in one form, an expense reporting system for viewing and manipulating a user's financial transaction data. The system includes a user's financial transaction data hosted in a data storage unit, addressable on a network, and accessible by a remote user on a user interface unit having a user input means and a display; and an expense reporting module having a graphical user interface (GUI).

The expense reporting module includes a transaction retrieval component operable to access the user's financial transaction data and generate representations thereof viewable by a user on the user interface unit display; a category generation engine operable to generate user-defined project category data and representations thereof viewable to a user on the user interface unit display; a transaction categorization engine operable to associate selected ones of the user's financial transaction data representations with one or more of the user-defined project category data representations; a GUI generation engine operable to express a graphical arrangement of the selected ones of the user's financial transaction representations associated with the one or more user-defined project category data representations on the user interface unit display; and a data record generation engine operable to convert the graphical arrangement into a data record, wherein the data record is in a form suitable for at least one of review, storage, modification, analysis, or exportation.

In another form, the invention includes a computer implemented method for expense reporting. The method includes the steps of: storing a user's financial transaction data on a data storage device such that the user's financial transaction data is accessible by a user interface device on a network; presenting a graphical user interface (GUI) for displaying representations of the accessed user's financial transaction data on a user interface unit; defining project category data and generating representations thereof; associating representations of the user's financial transaction data with user-defined project category data representations to create a graphical arrangement; and converting the graphical arrangement into a data record.

BRIEF DESCRIPTION OF THE DRAWINGS

The present invention is disclosed with reference to the accompanying drawings, wherein:

FIG. 2A is a first illustrative view of a graphical user interface displayed on a user interface unit for use with the present invention;

FIG. 2B is a second illustrative view of a graphical user interface displayed on a user interface unit for use with the present invention;

FIG. 3 is a user input form displayed on a user interface unit for use with the present invention;

FIG. 4 is an exemplary data record generated by the system and method of the present invention; and FIG. 5 is a flow diagram of a method of the present invention.

Corresponding reference characters indicate corresponding parts throughout the several views.

DETAILED DESCRIPTION

Figure 1A:
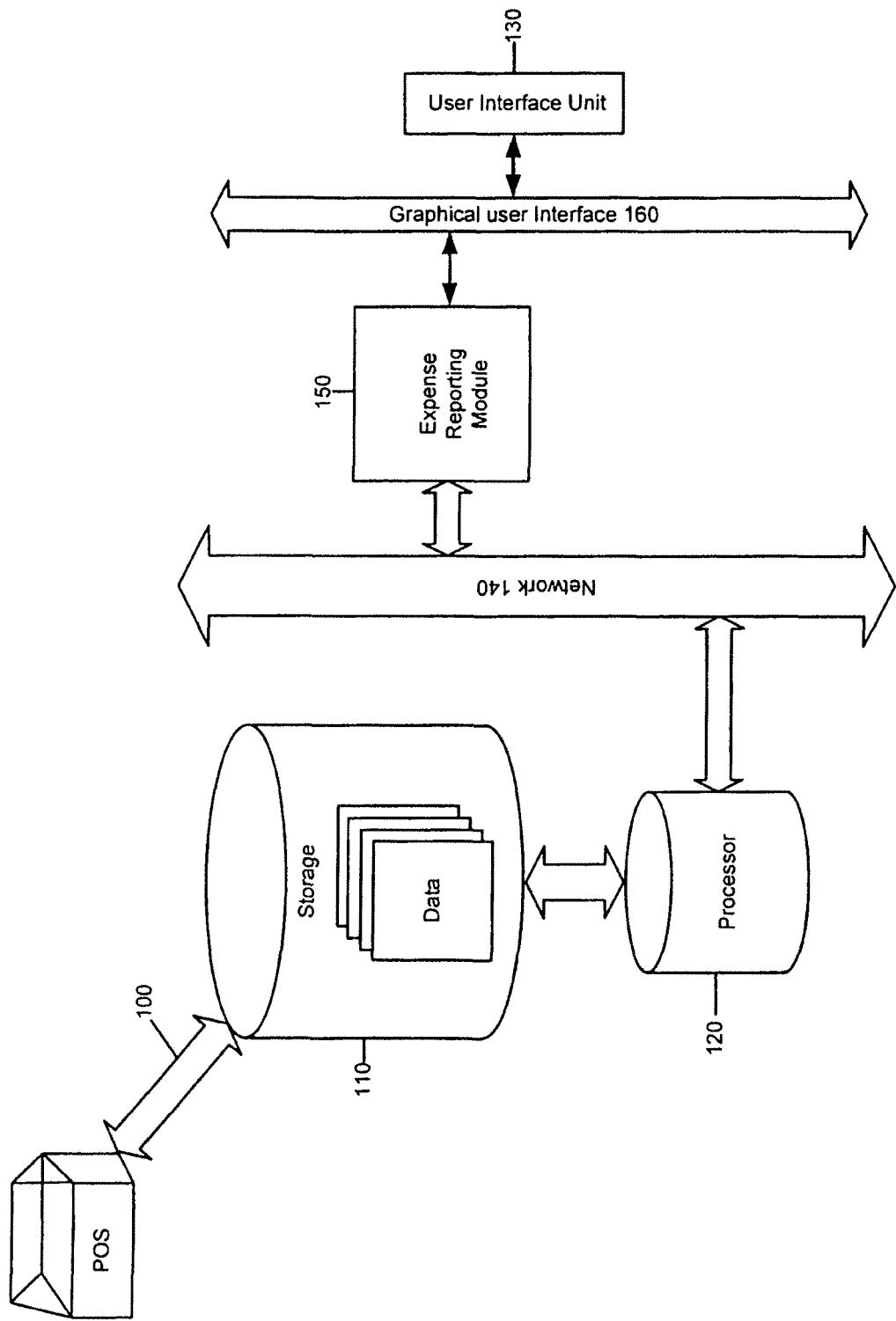
FIG. 1A is a block diagram of a system architecture suitable for implementing a first embodiment of the present invention.

Referring now to FIG. 1A, a system architecture suitable for implementing an embodiment of the expense reporting system of the present invention is shown. This system architecture includes a data storage unit 110 connected to a processor 120, wherein the processor 120 is addressable by a user interface unit 130 via a network 140. The system architecture further includes an expense reporting module 150 and a graphical user interface ("GUI") 160 for display on user interface unit 130.

Financial transaction data is stored on a data storage unit 110. Financial transaction data is electronic data representing any type of financial transaction, including, but not limited to: purchases, loans, mortgages, bank account transactions, credit card transactions, charge card transactions, debit card transactions, stored value card transactions, like-kind transactions, payments in exchange for services rendered, disbursements, etc.

In one embodiment, financial transaction data may be created in connection with use of a payment device in any transaction processing system 100 known in the art. Illustrative examples of transaction processing systems are described in U.S. Pat. Nos. 4,877,947 to Mori; 5,604,802 to Holloway; 4,375,032 to Uchida; 4,423,313 to Tanigaki; 4,594,663 to Nagata; 4,423,318 to Gotou; 4,587,379 to Masuda; 5,809,483 to Broka; 5,809,483 to Hafner; RE32,985 to Nagata; and 6,039,245 to Symonds. The payment device used in the transaction processing system may be any of a variety of devices. For example, the payment device may be a credit card, a smart card, RFID card, other funds card, a special device for effecting internet purchases, a program operating on a computer system, a key FOB, a device with a bar code, a phone, a device in a keychain, a processing component in an personal music device and/or any other payment device that is used by a user to effect a transaction. Further, the particular payment device may utilize a variety of technologies to interface with the a transaction processing system. Such interface used by the payment device may include magnetic stripe technology, wireless technology and/or a computer network, for example.

When a payment device is used in a financial transaction at a payment device activated terminal (e.g., automated teller machine ("ATMs"), point of sale ("POS") terminal, and the like), the transaction processing system 100 processes and stores financial transaction data relating to the transaction, for example, a customer's account information and the amounts to be charged to a customer's account (and credited to a account of a merchant). In addition to the customer's account information, the financial transaction data may also represent more detailed or "line-item" information regarding the transaction, including: purchase data, product data, product quantity data, purchase date data, purchase price data, merchant data, part number data, product name data, stock keeping unit (SKU) number data, receipt number data, universal product code data, barcode data, fee data, interest rate data, interest data, balance data, balance transfer data, debit card data, check data, line of credit access card data, and line of credit transaction card data, etc.

In one embodiment where the payment device is a credit card, a merchant's POS terminal reads information stored on the credit card, and software at the POS terminal communicates the credit card information and other financial transaction data in real-time to a financial institution or acquirer (e.g., bank, building society, thrift, credit union, stock brokerage, asset management firm, or other credit card issuing business) via the transaction processing system 100 (e.g., a credit card payment gateway, a VISA® Association network, etc.). In addition to the credit card information, the POS terminal software may further transmit detailed line-item transaction data to the financial institution in real time via the transaction processing system 100.

In another embodiment, the merchant performs a "capture routine" at the end of each day where the merchant transmits details on all completed credit card transactions for settlement with the financial institution via the transaction processing system 100. In this embodiment, the merchant may also transmit line-item transaction data along with the day's transaction data to the financial institution during settlement.

In a further embodiment, the financial institution may access line-item data regarding a customer's credit card transaction through an intermediary database. For example, the financial institution requests an intermediary data broker to obtain line-item data from a merchant regarding a particular customer's credit card purchase. The intermediary data broker obtains the requested data via a network from the merchant's mainframe, databases, or POS terminal, and thereafter transmits the line-item data to the financial institution.

In another embodiment, the merchant's POS terminal software accesses an intermediary database when processing a customer's transaction to obtain line-item data about a purchase in real time. For example, when processing a debit card purchase, the software accesses an inventory information approval system ("IIAS") to obtain product information from the IIAS database. The POS then transmits the transaction details along with the retrieved line-item data to a financial institution via the transaction processing system 100.

In a further embodiment, a customer or purchaser transmits line-item data about a purchase directly to their financial institution via a personal device such as a cell phone, Blackberry®, smart phone, PDA, etc. connected to a network. In this embodiment, the purchaser directly inputs UPC, SKU, or other data into the personal device while shopping, and thereafter transmits the data to the financial institution. Alternatively, while processing the purchase a POS terminal transmits line-item data wirelessly from the merchant's database directly to the customer's personal input device (e.g., via Bluetooth, RFID, infrared, etc.). The customer then transmits the data directly from the input device to the financial institution. In a further embodiment, the merchant's POS terminal transmits line-item data about a customer's purchase via electronic mail directly to the customer and/or the financial institution.

Once received, the financial institution stores the customer's financial transaction data in data storage unit 110 for use in connection with a service (e.g., expense reporting, e-banking, internet banking, e-statements, e-commerce, business-to-business (B2B) transactions, business-to-consumer (B2C) transactions, internet sales, or others known in the art). Illustrative examples of such services are described in U.S. Pat. Nos. 5,220,501 to Lawlor; 6,334,116 to Ganesan; 6,880,079 to Kefford; 5,903,881 to Schrader; 6,609,113 to O'Leary; and 6,606,606 to Starr. Among other things, the service may allow a customer to view financial transaction data via a user interface unit 130, described more fully herein.

The data storage unit 110 is connected to a processor 120. The processor executes commands and instructions, and may be a general purpose computer, but may utilize any of a wide variety of other technologies including: a special purpose computer, a microcomputer, mini-computer, mainframe computer, programmed micro-processor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID integrated circuits, smart chip, or any other device or arrangement of devices that is capable of implementing the steps of the processes of the invention.

The processor 120 is addressable by a user interface unit 130. User interface unit 130 may exchange data with the processor 120 in a distributed computing environment linked through a communications network 140 (e.g., the Internet). User interface unit 130 may include any hardware, software, or combination of hardware and software that allows a user to interact with the processor 120. For example, user interface unit 130 may be any computer system configuration, including, but not limited to: hand-held wireless devices such as mobile phones or PDAs, multiprocessor systems, microprocessor-based or programmable consumer electronics, mini-computers, mainframe computers, personal computers, and the like. User interface unit 130 may also include any of a mouse, touch screen, keyboard, voice reader, voice recognizer, dialogue screen, menu box, list, checkbox, toggle switch, a pushbutton or any other device that allows a user to receive information regarding the operation of the processor 120 as it processes a set of instructions and/or provides the user interface unit 130 with data or information. Accordingly, the user interface unit 130 is any device that provides communication between a user and a processor 120. Information provided by the user to the processor 120 through the user interface unit 130 may be in the form of a command, a selection of data, or some other input, for example.

As discussed above, the user interface unit 130 is typically used for interacting with the processor 120 either to convey information or receive information. However, it should be appreciated that in accordance with some embodiments of the system and method of the invention, it is not necessary that a human user actually interact with processor 120. Rather, it is also contemplated that the processor 120 of the invention might interact, i.e., convey and receive information, with another processing machine, rather than a human user. Accordingly, the other processing machine might be characterized as a user. Further, it is contemplated that a processor 120 utilized in the system and method of the invention may interact partially with another processing machine or processing machines, while also interacting partially with a human user.

The financial transaction management system as shown in may be practiced with various computer system configurations and may be described in the general context of computer-executable instructions, such as program modules, being executed by a computer. Generally, program modules include routines, programs, objects, components, data structures, etc. that perform particular tasks or implement particular abstract data types. In a distributed computing environment, program modules may be located in both local and remote computer storage media including memory storage devices.

In one embodiment, the financial transaction management system may include an operating system, application programs, program modules, and program data. The operating system may be or include a variety of operating systems such as Microsoft Windows® operating system, the Unix operating system, the Linux operating system, the Xenix operating system, the IBM AIX™ operating system, the Hewlett Packard UX™ operating system, the Novell Netware™ operating system, the Sun Microsystems Solaris™ operating system, the OS/2™ operating system, the BeOS™ operating system, the Macintosh™® operating system, the Apache™ operating system, an OpenStep™ operating system or another operating system of platform.

The system of the present invention may further include a memory including at least one set of instructions that is either permanently or temporarily stored. The processor 120 executes the instructions that are stored in order to process data. The set of instructions may include various instructions that perform a particular task or tasks, such as those shown in the appended flowcharts. Such a set of instructions for performing a particular task may be characterized as a program, software program, software, engine, module, component, mechanism, or tool.

The system may also include one or more software processing modules stored in a memory as described above and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer.

Any suitable programming language may be used in accordance with the various embodiments of the invention. Illustratively, the programming language used may include assembly language, Ada, APL, Basic, C, C++, COBOL, dBase, Forth, FORTRAN, Java, Modula-2, Pascal, Prolog, REXX, and/or JavaScript for example. Further, it is not necessary that a single type of instruction or programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module.

Figure 1B:
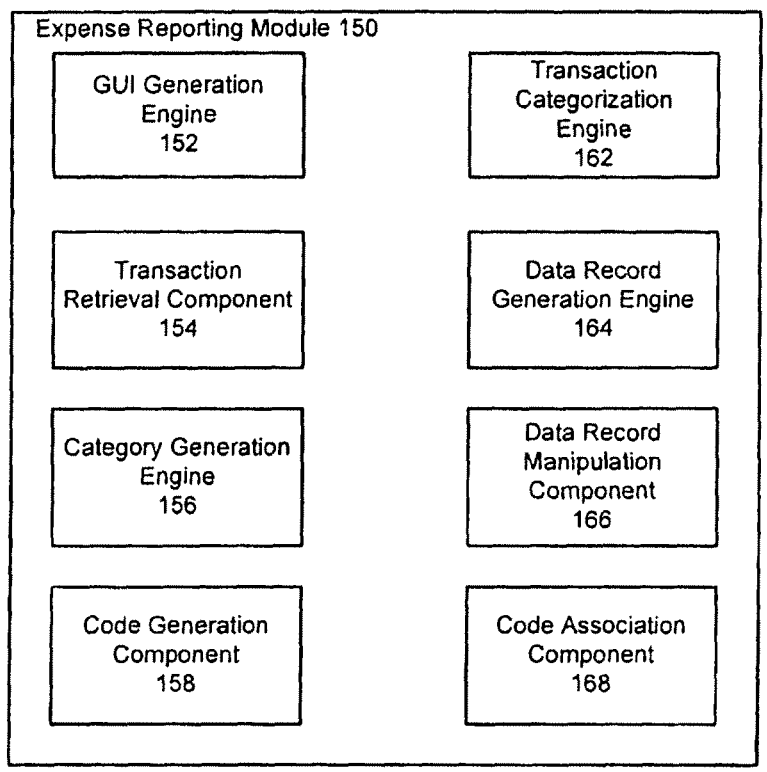
FIG. 1B is a block diagram illustrating components of an expense reporting module in accordance with an embodiment of the present invention.

In one embodiment, the system of the present invention includes an expense reporting module 150 enabling a user to organize financial transaction data into categories. The expense reporting module 150 may be stored in a computer memory, preferably a RAM (not shown), so as to be easily accessible to the processor 120 or other processing unit. As shown in FIG. 1B, the expense reporting module 150 may include: a graphical user interface (GUI) generation engine 152; a transaction retrieval component 154; a category generation component 156; a code generation component 158; a transaction categorization engine 162; a data record generation engine 164; a data record manipulation component 166; and a code association component 168.

The expense reporting module 150 may further include a GUI 160 generated by GUI generation engine 152. As contemplated by the present invention, a GUI 160 is a type of user interface which allows a user to interact with a computer and computer-controlled devices which employ graphical icons, visual indicators or special graphical elements, along with text, labels or text navigation to represent data or actions available to a user. The GUI 160 enhances the usability of the underlying expense reporting module. The GUI 160 may include graphical elements (widgets) that may be used to interact with the expense reporting module. The GUI 160 may include common widgets such as windows, buttons, menus, scroll bars, and frames or containers for the presentation of content such as a web page.

In one embodiment, the expense reporting module 150 is operable to access a user's financial transaction data stored in data storage unit 110 through the transaction retrieval component 154. As shown in FIGS. 2A and 2B, the module generates representations of the user's financial transaction data viewable by a user on GUI 160 displayed on the user interface unit 130. Representations of the user's financial transaction data may be graphical icons, visual indicators, alpha-numeric text, special graphical elements, or the like. In one embodiment, the module generates alpha-numeric text and graphical representations 220 of the user's financial transaction data, and presents the representations 220 in a list 230 viewable on the display of a user interface unit 130.

The expense reporting module 150 may further enable a user to define one or more project categories through the category generation engine 156. A project category may be any designation defined by a user to organize, systematize, classify, or categorize financial transaction data represented by financial transaction data representations 220. For example, a user may desire to categorize financial transaction data by project, matter, job, client, number, customer, and the like.

The expense reporting module 150 may present the user with an input form 300, profile window, or similar dialogue screen like that shown in FIG. 3 to prompt the user to define a project category through the category generation engine 156. A user may input any variety of data in any number of data input fields presented by the input form 300. Data input fields may include category name 310, description 320, picture 330, user-defined code identifier 340, and date 350. Once a user inputs user-defined category data, the module may generate alpha-numeric text and/or graphical representations 250 of the user-defined category data, and present the representations 250 in a manner viewable by a user on GUI 160 displayed on the user interface unit 130. A user may define any number or variety of project categories.

The expense reporting module 150 may generate and link a user-defined project category with a user-defined code identifier 340 through a code generation component 158 and a code association component 168. The user-defined code identifier may be any combination of letters, numerals, symbols, etc. desired by the user to designate a particular project category. For example, a user-defined code identifier may be a job code, matter number, client number, or the like.

In one embodiment shown in FIG. 2B, GUI 160, through the GUI generation engine 152, presents financial transaction data representations 220 and/or user-defined category data representations 250 as graphical elements capable of being manipulated by a user. For example, the GUI 160 may enable a user to select ones of the user's financial transaction representations 220 and "click and drag" or "drag and drop" the selected representation. Generally, "drag and drop" is the action of (or support for the action of) clicking on a virtual object and dragging it to a different location or onto another virtual object in the context of a GUI. In general, it can be used to invoke many kinds of actions, or create various types of associations between two abstract objects. The basic sequence involved in "drag and drop" is: a user presses, and holds down, a button on a mouse or other pointing device operatively connected to user interface unit 120 to "grab" a selected one of representations 220, "drags" the selected representation 220/cursor/pointing device to a desired location, and "drops" the representation 220 by releasing the button.

The GUI 160 may further enable a user to "drag and drop" selected ones of the user's financial transaction data representations 220 onto one or more user-defined project category data representations 250. Once a user "drops" a selected representation 220 on a project category data representation 250, the transaction categorization engine 162 will associate data represented by the selected financial transaction data representation 220 with the data represented by the user-defined project category data representation 250. As should be apparent to one of ordinary skill in the art, a user may "click and drag" or "drag and drop" one or more financial transaction data representations 220 onto one or more user-defined project category data representations 250 to organize the financial data into categories, and for viewing, modifying, or processing the data. In a further embodiment, the transaction categorization engine 162 is operable to reverse the process and enable a user to remove, delete, or "drag and drop" transaction data representations 220 to effect a dis-association with one or more of the user-defined project category data representations 250.

The expense reporting module 150 may further express a graphical arrangement of the selected ones of the user's financial transaction representations 220 associated with the one or more user-defined project category data representations 250. As shown in FIG. 4, the data record generation engine 164 may convert the graphical arrangement into a data record 400, wherein the data record is in a form suitable for at least one of: review by a user 410, storage in a memory, analysis 420 or modification 430 by a user or processor, or exportation 440 in a form usable by another software program or application. For example, a user may view a data record 400 (containing all or some of the financial data associated with a particular user-defined category), download the data record, or export the data record to a personal finance management application such as Quicken®, Microsoft Money®, or the like.

In a further embodiment, a user may click, select, or otherwise choose a user-defined category data representation 250 to view, modify, or process the data record 400 associated with that user-defined category. For example, a user may click on a user-defined category data representation 250 and view a linked webpage that includes a list of the financial transactions associated with the category.

The expense reporting module 150 may further include a data record manipulation component 166 whereby a user can manually edit or otherwise manipulate the data record. In such embodiments, the user may add further data to the record, such as labor costs and mark-up information. As a result, the user is enabled to track profit margins. Additionally, the data record manipulation component 166 may enable a user to create receipts, invoices, or other summaries of a data record 450 that can be stored, printed, or exported. The expense reporting module 150 may further include other processes, for example, a tax calculation process, a financial analysis process, or the like, to create a customized receipt (including a user's purchases and appropriate tax calculation or other information), and charts or graphs representing expenditures over a specified time period.

The expense reporting module 150 may further enable a user to associate only a desired portion of the user's financial transaction data represented by one of the representations 220 with one or more of the user-defined project categories. For example, as shown in FIG. 2B, representation 220 may represent financial transaction data including an amount of currency or credit (e.g., a dollar amount). When a user selects representation 220 and "drags and drops" representation 220 on a user-defined project category representation 250, the user may be prompted to designate a percentage of the total amount of currency, or some amount less than, equal to, or greater than the total amount of currency, for association with the user-defined category. The module may present the user with an input form, profile window, or similar dialogue screen to input the desired percentage or currency amount.

The expense reporting module 150 is further operable to generate a bar code through a bar code generation component (not shown) including at least data representing the user-defined code identifier 340, to represent a user-defined project category linked to the code identifier through code association component 168. In practice, a user may electronically display or print the bar code, and thereafter have the bar code scanned in connection with presenting a payment device at a POS or other terminal. The bar code data may be linked to and transmitted with some or all of the financial transaction data for processing or storage by a financial institution. In another embodiment, a POS may prompt a user for a user-defined code identifier upon presenting a payment device to transmit the user-defined code identifier with some or all of the financial transaction data. The transaction categorization engine 162 may then automatically associate the user's financial transaction data linked to the user-defined code identifier to the user-defined project category data linked with the same or a corresponding user-defined code identifier. As a result, the system will also associate financial transaction data representations with a user-defined project category data representation without the need for a user to "drag and drop" or otherwise manually manipulate the financial transaction data representations.

The computing environment of the financial transaction management system of the present invention may also include other removable/nonremovable, volatile/nonvolatile computer storage media. For example, a hard disk drive may read or write to nonremovable, nonvolatile magnetic media. A magnetic disk drive may read from or writes to a removable, nonvolatile magnetic disk, and an optical disk drive may read from or write to a removable, nonvolatile optical disk such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each of the processor and/or memory may be composed of different physical pieces of equipment.

Various networks may be implemented in accordance with embodiments of the invention, including a wired or wireless local area network (LAN) and a wide area network (WAN), wireless personal area network (PAN) and other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths.

Although many other internal components of the computer are not shown, those of ordinary skill in the art will appreciate that such components and the interconnections are well known. Accordingly, additional details concerning the internal construction of the computer need not be disclosed in connection with the present invention.

Turning to FIG. 5, a computer implemented method 500 for managing project financial transactions is illustrated in a flow diagram. A user's financial transaction data is stored 501 on a data storage device such that the user's financial transaction data is retrievable via a network. The user's financial transaction data is accessed 502, for example, by the system of the present invention hereinbefore described. A graphical user interface (GUI) viewable by a user on the user interface device is presented 503 for displaying representations of the user's financial transaction data. Project categories are then defined 504 via the user interface unit to generate 505 representations of the user-defined project category data. The user may then drag and drop or otherwise arrange 506 representations of the user's financial transaction data onto user-defined expense category data representations to create a graphical arrangement. The graphical arrangement is then converted 507 into a data record, wherein the data record is in a form suitable for at least one of review, storage, analysis, modification, or exportation. The data record may then be reviewed 508, modified 509, analyzed 510, stored in a memory 511, or exported 512 to another program or application.

Optionally, a desired percentage or portion of currency represented by one of the selected ones of the user's financial transaction representations is associated with one or more of the user-defined project category data representations (not shown).

Additionally, a code identifier may be generated or defined 530. The defined code identifier may be linked to a user-defined project category. A bar code representing the user-defined project category linked to the user-defined code identifier may then be generated 531. The user-defined project category linked with a user-defined code identifier may then be automatically associated with a user's financial transaction data linked to a corresponding user-defined code identifier.

The examples set out herein illustrate several embodiments of the invention but should not be construed as limiting the scope of the invention in any manner.

EXAMPLE 1

A user purchases a plurality of goods from a merchant such as Home Depot® for a renovation project ("Project A") and a charitable event ("Project B") in a single transaction totaling $100.00 using a payment device such as a credit card. The credit card transaction is processed by any means known in the art, and financial data relating to the transaction is stored by a financial institution (e.g., the credit card issuer) on a data storage unit connected to a processor for use in association with an online expense reporting service. The user logs-in or otherwise accesses the service provided by the financial institution via a computer connected to the Internet. When the user accesses the service, the user's financial transaction data is accessed and presented via a GUI on a website including graphical representations of the user's financial transaction data. The user is thus able to view graphical representations of any or all of the purchases made with the credit card, including the $100 transaction at Home Depot®. The user defines project categories using an input form, e.g., "Project A" and "Project B," and thereafter the system generates graphical representations of the "Project A" and "Project B" categories. The user then selects the graphical representation of the $100.00 Home Depot® transaction with a pointer or cursor, and "drags and drops" the representation onto the graphical representation of "Project A." The system may then prompt the user to designate a percentage of the total $100.00, or some desired amount less than, equal to, or greater than $100.00, for association with the "Project A" category. The plurality of goods purchased for the renovation project ("Project A") totaled $50.00. The user designates 50% of the $100.00 for association with the "Project A" category. The system then associates data representing $50.00 with the "Project A" category and expresses a graphical arrangement of the $50.00 data representation associated with "Project A." The user may choose to repeat the steps in order to associate the remainder of the $100.00 Home Depot® transaction with "Project B." The system then converts the graphical arrangement into a data record. The data record is in a form suitable for at least one of: review by the user, storage in a memory, analysis or modification by the user or a processor, or exportation in a form usable by another software program or application.

EXAMPLE 2

Further to EXAMPLE 1 above, the user views the data record associated with "Project A" via the website, and thereafter exports the data record to Microsoft Money®.

EXAMPLE 3

Further to EXAMPLE 1 above, the user views the data record associated with "Project A" and uses the system's data record manipulation component to edit the data record by adding labor costs and mark-up information. Additionally, the user prompts the system to create an invoice from the edited data record.

EXAMPLE 4

Further to EXAMPLE 1 above, the financial transaction data relating to the $100 Home Depot® transaction includes not only the total amount paid to the merchant ($100.00), but a variety of line-item details transmitted by Home Depot® to the credit card issuer via a "capture routine" performed by Home Depot® at the end of the day during the process of settling with the credit card issuer. The user views graphical representations of any or all of the line-item details relating to the transaction on the website page, and selectively manipulates or "drags and drops" any or each of the graphical representations of the line item details onto the "Project A" category representation.

EXAMPLE 5

Further to EXAMPLE 1, the user defines a third project category using an input form, e.g., "Project C," and the system generates a graphical representation of the "Project C" category. The user further designates "Project C" with a user-defined code identifier "092580," representing a job code. The user prompts the system to generate a bar code including user-defined code identifier "092580" to represent "Project C." The user prints the bar code and brings the bar code to the merchant AHY Hardware™ to purchase tools for use in "Project C." The merchant scans the bar code in conjunction with processing the user's credit card at the merchant's POS or other terminal to purchase the tools. The bar code data, including the identifier "092580" is linked to and transmitted with some or all of the tool purchase transaction data for processing or storage by the financial institution. The transaction categorization engine then automatically associates the tool purchase transaction data linked to the user-defined code identifier "092580" to "Project C." As a result, the user will not need to "drag and drop" or otherwise manually manipulate graphical representations of tool purchase transaction to associate them with category "Project C."

The system of the present invention may also include a data record manipulation component for enabling a user to review, store, modify, analyze, or export a data record.

While the invention has been described with reference to particular embodiments, it will be understood by those skilled in the art that various changes may be made and equivalents may be substituted for elements thereof without departing from the scope of the invention. In addition, many modifications may be made to adapt a particular situation or material to the teachings of the invention without departing from the scope of the invention.

Therefore, it is intended that the invention not be limited to the particular embodiments disclosed as the best mode contemplated for carrying out this invention, but that the invention will include all embodiments falling within the scope and spirit of the appended claims.

I claim:

1. An expense reporting system for viewing and manipulating a user's financial transaction data from a cash transaction, comprising:
   a user interface unit having user input means and a display, the user interface unit being configured for communicating with a processor connected to a data storage unit, the data storage unit storing a user's financial transaction data and being accessible over a network by a remote user on the user interface unit;
   an expense reporting module having a graphical user interface (GUI), the expense reporting module comprising:
      a transaction retrieval component operable to access the user's financial transaction data and generate representations thereof viewable by a user on the user interface unit display;
      a category generation engine operable to generate user-defined project category data and representations thereof viewable to a user on the user interface unit display;
      a code generation component operable to generate a user-defined code identifier;
      a code association component operable to link the user-defined project category data and representations thereof with the user-defined code identifier;
      a transaction categorization engine operable to associate a percentage or portion of selected ones of the user's financial transaction data representations with one or more of the user-defined project category data representations, the transaction categorization engine being further operable to automatically associate the user-defined project category data linked to the user-defined code identifier with the user's financial transaction data;

a GUI generation engine operable to express a graphical arrangement of the selected ones of the user's financial transaction representations associated with the one or more user-defined project category data representations on the user interface unit display;

a data record generation engine operable to convert the graphical arrangement into a data record, wherein the data record is in a form suitable for at least one of review, storage, modifications, analysis or exportation; and a data record manipulation component operable to at least enable the user to manually designate a fraction of a single transaction to be associated or disassociated with a selected one of the user-defined project category data representations.

2. The system of claim 1, wherein the user's financial transaction data includes any one or more of: purchase data, product data, product quantity data, purchase date data, purchase price data, vendor name data, vendor part number data, product name data, stock keeping unit (SKU) number data, tax data, discount data, receipt number data, universal product code data, and barcode data fee data.

3. The system of claim 1, further comprising a bar code generation component for generating a bar code representing the user-defined code identifier.

4. The system of claim 3, wherein the bar code is readable at a point of sale (POS) terminal.

5. The system of claim 1, wherein the GUI generation engine is further operable to express a graphical arrangement of representations of the user-defined project category data linked to the user-defined code identifier and associated with representations of the user's financial transaction data.

6. The system of claim 1, further comprising a data record manipulation component operable to generate a receipt including data from the data record.

7. The system of claim 1, wherein the transaction categorization engine is further operable to dis-associate selected ones of the user's financial transaction representations associated with one or more of the user-defined project category representations.

8. A computer implemented method for viewing and manipulating a user's financial transaction data from a cash transaction, the method comprising:

storing a user's financial transaction data on a data storage device such that the user's financial transaction data is accessible by a user interface device on a network;

presenting a graphical user interface (GUI) for displaying representations of the accessed user's financial transaction data on a user interface unit;

defining, using a processor, project category data and generating representations thereof;

generating a code identifier and linking user-defined project category data to the code identifier;

associating, using the processor, representations of a desired percentage or portion of the user's financial transaction data with one or more of the user-defined project category data representations to create a graphical arrangement;

automatically associating the user-defined project category data linked to the code identifier with the user's financial transaction data;

converting the graphical arrangement into a data record, wherein the data record is in a form suitable for at least one of: review, storage, modification, analysis, and exportation; and enabling the user to manually designate a fraction of a single transaction to be associated or disassociated with a selected one of the user-defined project category data representations.

9. The method of claim 8, further comprising: enabling a user to at least one of: review a data record, modify a data record, store a data record, analyze a data record, and export a data record.

10. The method of claim 8, further comprising: dis-associating selected ones of the user's cash transaction data representations from one or more associated user-defined project category data or representations thereof.

11. The method of claim 8, further comprising: generating a bar code representing the code identifier.

12. The method of claim 8, further comprising: transmitting the user's financial transaction data from a point of sale (POS) terminal to the data storage device.

13. The method of claim 12, wherein the user's financial transaction data includes one or more of: purchase data, product data, product quantity data, purchase date data, purchase price data, vendor name data, vendor part number data, product name data, stock keeping unit (SKU) number data, tax data, discount data, receipt number data, universal product code data, barcode data, and fee data.

14. The system of claim 1, wherein the user-defined code identifier comprises a combination of letters, numerals, or symbols.

15. The system of claim 14, further comprising a point of sale (POS) terminal operable to prompt the user to enter the user-defined code identifier.

16. The system of claim 4, wherein the POS terminal is operable to scan the bar code representing the user-defined code identifier.

17. The system of claim 4, wherein the bar code is electronically displayed by the user at the POS terminal.

18. The method of claim 8, further comprising generating a bar code representing the code identifier.

19. The method of claim 18, wherein the bar code is readable at a point of sale (POS) terminal.

20. The method of claim 19, further comprising scanning the bar code representing the code identifier at a point of sale (POS) terminal.

21. The method of claim 19, wherein the bar code is electronically displayed by the user at the POS terminal.

22. The method of claim 9, wherein the code identifier comprises a combination of letters, numerals, or symbols.

23. The method of claim 22, further comprising prompting the user to enter the code identifier at a point of sale (POS) terminal.

* * * * *